Patented Nov. 10, 1953

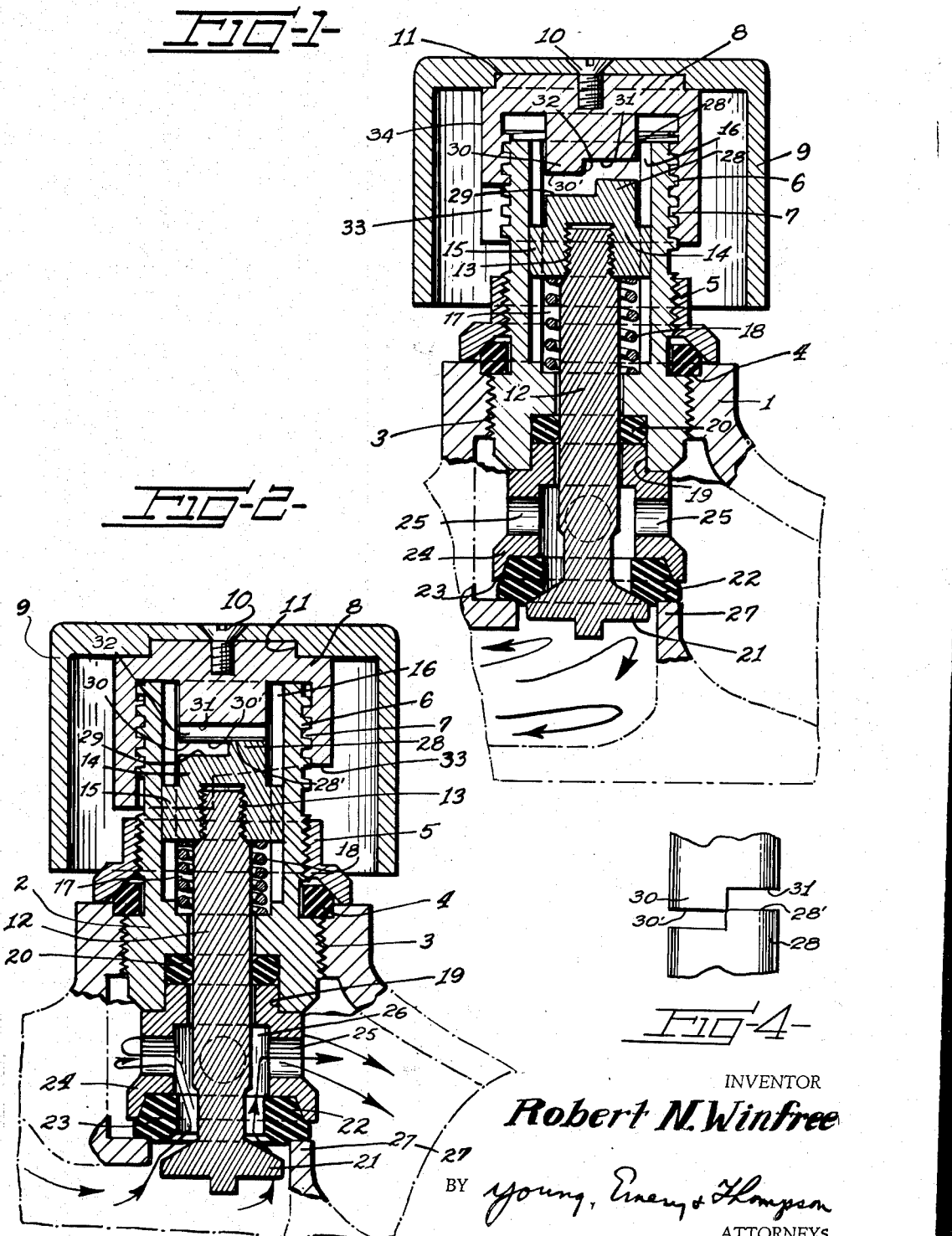

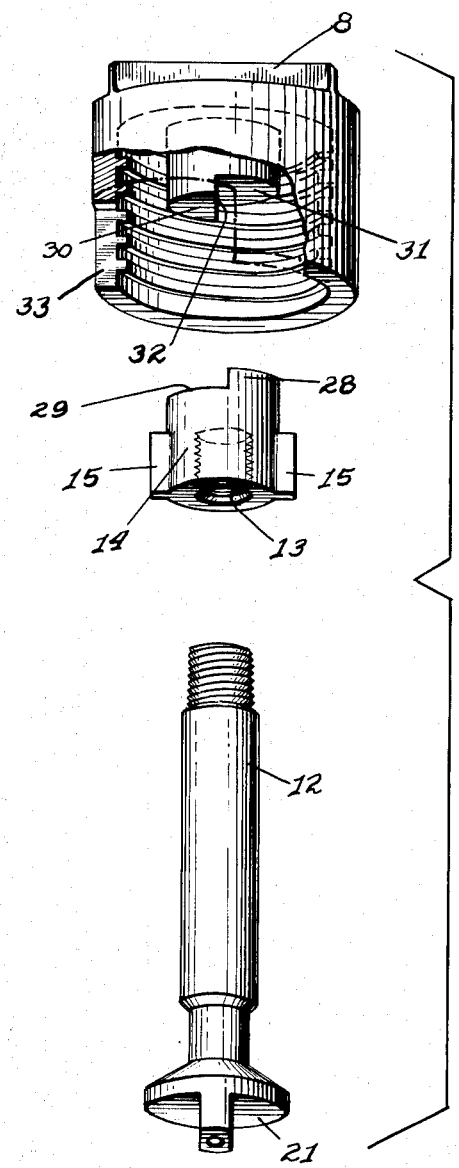

2,658,716

UNITED STATES PATENT OFFICE 2,658,716

MANUAL AND AUTOMATIC VALVE

Robert N. Winfree, Lynchburg, Va.

Application May 31, 1950, Serial No. 165,284

5 Claims. (Cl. 251—141)

This invention relates to a valve of the type which is applicable for all water and other distribution systems both large and small.

It is an object of this invention to provide a valve with means to cause automatic and quick closing of the valve at a point just before the final seating of the valve spindle or disk on the seat.

A further object of the invention is to provide a valve with mechanism to prevent dripping of the valve due to slow closing or closing with too light a force for complete closure.

Another object of the invention resides in the provision of a mechanism which will positively open and close the valve with the final last degree of closure taking place automatically as a quick final closure without manual effort.

A still further object of the invention resides in the provision of a valve mechanism which will prevent wear on the washer on the valve seat in that the washer is prevented from rotating so that the life of the washer is greatly prolonged, and also lack of wear will prevent loss of water due to a dripping valve or faucet when in the closed position.

Another object of the invention resides in the provision of a valve having positive means to open the valve with manual closing of the valve, but, however, final positive closing of the valve to prevent water from dripping from the valve is accomplished by spring force.

Further objects of the invention will be apparent from the following description when considered in connection with the accompanying drawings in which:

Figure 1 is a longitudinal sectional view of one form of the valve showing the parts in the closed position, Fig. 2 is a longitudinal sectional view of the valve of Fig. 1 showing the parts in the open position, Fig. 3 is an exploded view of the operating parts of the valve of Figs. 1 and 2, and Fig. 4 is an elevational view of a detail on an enlarged scale.

The valve is of the type in which water pressure is used to aid in the closing of the valve. The valve casing or casting 1 is provided with a valve housing 2 threaded at 3 into the casing 1 and sealed by means of a washer 4 secured in place by a threaded collar 5. The housing 2 is also provided with a screw-thread 6 which meshes with a similar screw-thread 7 internally provided in a cap member 8, to which is secured a handle member 9 of any desired configuration. The handle 9 is secured on the cap member by a suitable screw 10 and these parts 9 and 10 rotate together by means of a projection 11 formed integral with the cap 8 and fitting into an opening in the handle 9 of the same configuration.

The moving parts of the valve including the handle 9 and cap 8 comprise a valve stem 12 threaded at 13 into an actuating slide member 14. The actuating slide 14 is provided with one or more side guide lugs or keys 15 which slide in corresponding grooves 16 provided on the internal surface of the housing 2, as shown in Figs. 1 and 2. As shown, the grooves 16 are provided in the upper hollow portion 17 in which a coiled compression spring 18 is also provided. Also a lower hollow portion 19 is provided in the housing 2 in which a washer 20 is provided to seal the stem 12 relative to the housing 2. The lower end 21 of the stem is provided with a conical surface which cooperates with a washer 22, the latter sealing in a depression 23 in a valve thimble or sleeve 24.

The sleeve 24 is provided with a plurality of openings 25 and these openings together with the internal space 26 permit the flow of water when the valve is in the open position as shown in Fig. 2 as indicated by the arrows. The washer 22 also contacts the rim 27 of the valve casing 1.

The upper end or surface of the slide 14 is provided with a projecting member or cam 28 and a surface 29, this forming a step portion as clearly shown in Figs. 1 to 3. This projecting member 28 cooperates with a similar member 30 on the under side of the cap member 8 including also a surface 31 forming a step portion 32 with the member 30. The member 28 has a top surface 28' and the member 30 has a bottom surface 30' with both surfaces contacting each other in the position of Fig. 2.

The cap 8 is provided with a skirt portion 34 in which the threads 7 are internally provided, and this skirt portion has a cut-out portion 33 which cooperates with a stop pin, not shown, to limit the rotary movement of the handle 9.

The operation of the valve is believed to be obvious from the foregoing description. In the position of Fig. 1 which shows the valve closed, to open the valve it is only necessary to rotate the handle 9 whereby by means of the screwthreads 6 and 7 the cap 8 will be lowered as well as rotated until the lower horizontal surface 30' of member 30 contacts the upper-most horizontal surface 28' of the projecting member 28 on the upper surface thereof. In order to aid the contacting surfaces 28' and 30' to cam on each other one or both edges may be slightly rounded as shown exaggerated in Fig. 4. Then the slide 14 together with the valve stem 12 will move downward from the position of Fig. 1 to Fig. 2 to open the valve 21 to permit water to flow out of the spigot. If now the valve is closed, rotation of the handle 9 in the opposite direction will cause the members 14 and 12 to move upward, Fig. 2, not only influenced by the water pressure but also by the force of the spring 18 until the valve 21 is almost closed at which point the member 30 will move off of the member 28 causing the valve to close with a positive movement influenced by the spring 18. Thus the valve is self closing in its final movement, that is, when the valve approaches the washer 22 the point where there would be a very slight flow of water just previous to a drip, there is a positive closing of the valve entirely independent from the actual final closing of the valve by the handle.

From the described and illustrated valve or spigot, it will be apparent that the structure is such that the final closing of the valve is accomplished automatically and not by any manual control. It so often happens that valves are not tightly closed which will result in a water drip which is, of course, to be avoided due to waste of water. If on the other hand the valve is closed very tight by manual effort, the washer will soon wear out or be actually torn, which will cause a drip with resultant loss of water. Thus with the structure of the present invention the valve is closed manually to just where it will drip and thereafter automatically the valve is tightly closed. The valve of this invention will thus save on water consumption, and also on washer replacement since there is practically no wear on the washer.

I claim:

1. A valve for fluid systems comprising a casing, a closure disk and stem in said casing, said disk cooperating with a seat portion in the casing, manual means mounted on the casing for actuating the closure disk by means of its stem to open the valve and to partially close the valve down to where a slight opening still exists between the disk and the seat, and means in the casing and on the valve stem to automatically cause a final free closing of the valve after the manual partial closing operation has been completed, said last-mentioned means including a pair of projecting members one rigidly mounted on the end of the valve stem and the other mounted in the manual means so that upon closing of the valve the manual operation will take place while the projecting members are in contact but the automatic operation takes place at the end of the contact of the projecting members.

2. A valve for fluid sysems comprising a housing having a screw-threaded portion, a spindle slidably mounted in the housing and having a closure disc at one end thereof, a slide member secured on the other end of the spindle and slidably mounted in the housing and being provided with a stepped face, providing an upper and a lower surface, a handle member having a screw-threaded portion to cooperate with the screw-threaded portion in the housing and also having a stepped face provided with an upper and a lower surface to cooperate with the stepped face of the slide member to thus provide complimentary surfaces, said cooperating screw-threaded portions permitting the opening of the valve when in the closed position by rotation of the handle, and means to constantly urge one stepped face toward the other so that in the closed position of the closure disc the stepped faces will be spaced and out of contact relative to the surfaces and in the open position of the disc the stepped faces will contact with each other by means of the upper surface of one face and the lower surface of the other face and will be slidable relative to each other during the opening and closing of the valve, said stepped faces moving out of said surface contact with each other just before the complete closure of the disc so that the first-mentioned means will close the valve automatically.

3. A valve according to claim 2, in which the first-mentioned means is in the form of a spring around the spindle and abutting at one end in the housing and the other end against the slide member.

4. A valve according to claim 2, in which each stepped face is in the form of two substantially plane surfaces.

5. A valve for fluid systems comprising a housing having a screw-threaded portion, a handle member having a screw-threaded portion cooperating with the screw-threaded portion of the housing and having stepped actuating surfaces, a valve spindle slidably mounted in the housing and having stepped actuating surfaces at one end, and means to urge the uppermost stepped surface of the spindle into contact with the lowermost stepped surface of the other actuating member when the valve is open and when the valve is almost closed said two stepped contacting surfaces move out of contact with each other to automatically close the valve with all the surfaces of both stepped surfaces being out of contact with each other, said cooperating screw-threaded portions permitting the opening of the valve when in the closed position by rotation of the handle.

ROBERT N. WINFREE.

References Cited in the file of this patent

UNITED STATES PATENTS

| Number | Name | Date |
|---|---|---|
| 1,165,026 | Schreidt | Dec. 21, 1915 |
| 1,480,942 | McKee | Jan. 15, 1924 |
| 1,539,305 | Dunne | May 26, 1925 |
| 1,575,547 | Conrad | Mar. 2, 1926 |
| 1,777,001 | Kellan | Sept. 30, 1930 |
| 1,800,661 | Rosewood | Apr. 14, 1931 |
| 2,606,450 | Bolling | Aug. 12, 1952 |

FOREIGN PATENTS

| Number | Country | Date |
|---|---|---|
| 471,254 | Great Britain | of 1937 |
| 540,843 | Great Britain | of 1941 |